United States Patent

Mauro-Vetter

[11] Patent Number: 6,095,347
[45] Date of Patent: Aug. 1, 2000

[54] ADJUSTABLY MOUNTED ELONGATED CONVEYOR AND TRANSVERSE PICKING TRAY

[75] Inventor: Timothy Mauro-Vetter, Davisburg, Mich.

[73] Assignee: Chrysler Corporation, Auburn Hills, Mich.

[21] Appl. No.: 08/990,944

[22] Filed: Dec. 15, 1997

[51] Int. Cl.[7] .............................. A47F 1/04; A47B 47/02; A47B 57/04
[52] U.S. Cl. ........................... 211/151; 211/187; 211/59.2
[58] Field of Search .................................. 211/151, 59.2, 211/187, 182; 108/106, 107; 414/276; 198/360, 457.01, 406; 193/44, 47

[56] References Cited

U.S. PATENT DOCUMENTS

| | | | |
|---|---|---|---|
| 1,238,248 | 8/1917 | Beckman | 211/151 |
| 1,745,784 | 2/1930 | Davis . | |
| 2,013,284 | 9/1935 | Michaud | 211/59.2 |
| 2,594,295 | 4/1952 | Cushman . | |
| 2,769,551 | 11/1956 | Just . | |
| 2,840,220 | 6/1958 | Antonelli | 198/406 |
| 3,040,904 | 6/1962 | St. Amour . | |
| 3,063,534 | 11/1962 | St. Amour . | |
| 3,150,763 | 9/1964 | Immesberger | 198/358 |
| 3,220,527 | 11/1965 | Curtis . | |
| 3,499,539 | 3/1970 | Fisher . | |
| 3,776,675 | 12/1973 | Veneria | 425/139 |
| 3,900,112 | 8/1975 | Azzi et al. . | |
| 4,168,780 | 9/1979 | Parrott . | |
| 4,265,354 | 5/1981 | Sinnema | 198/374 |
| 4,372,451 | 2/1983 | Rasmussen et al. . | |
| 4,494,900 | 1/1985 | Johnson et al. | 414/27 |
| 4,625,855 | 12/1986 | Klaus | 198/367 |
| 4,723,885 | 2/1988 | Grube et al. . | |
| 4,752,175 | 6/1988 | Lichti | 414/276 |
| 4,790,707 | 12/1988 | Magretta et al. . | |
| 4,804,078 | 2/1989 | Scata | 198/360 X |
| 4,815,914 | 3/1989 | O'Brien et al. | 414/276 |
| 4,846,627 | 7/1989 | Steuart | 414/800 |
| 4,915,237 | 4/1990 | Chang et al. | 209/524 |
| 5,094,350 | 3/1992 | Smock . | |
| 5,115,920 | 5/1992 | Tipton . | |
| 5,119,942 | 6/1992 | McCullars . | |
| 5,201,429 | 4/1993 | Hikosaka et al. . | |
| 5,259,518 | 11/1993 | Sorenson et al. . | |
| 5,405,023 | 4/1995 | Murakami . | |
| 5,407,083 | 4/1995 | Bertleff | 209/655 |
| 5,419,444 | 5/1995 | Strom . | |
| 5,484,150 | 1/1996 | Yasutomi . | |
| 5,513,936 | 5/1996 | Dean | 414/273 |
| 5,607,068 | 3/1997 | Coretti, Jr. et al. . | |
| 5,641,052 | 6/1997 | Lazzarotti et al. | 198/360 X |
| 5,735,661 | 4/1998 | De Frondeville et al. | 414/276 |

OTHER PUBLICATIONS

Industrial Footrests, p. 96, Lyon Workspace Products, 1996.
Unistrut Metal Framing General Engineering Catalog, North American Edition, No. 12.

*Primary Examiner*—Daniel P. Stodola
*Assistant Examiner*—Gregory J. Strimbu
*Attorney, Agent, or Firm*—Lawrence J. Shurupoff

[57] ABSTRACT

A conveyor and picking tray assembly includes a conveyor frame mounting elongated upper and lower conveyors. The conveyors slope downward from their rear ends to their front ends. A picking tray frame adjacent to the front end of the conveyor frame mounts picking trays in general alignment with the upper and lower conveyors. The trays slope downward from one of their side edges to the other of their side edges in a direction transverse to the lengthwise dimension of the conveyors for the convenience of an operator working on an assembly line alongside the conveyor and picking tray assembly.

4 Claims, 4 Drawing Sheets

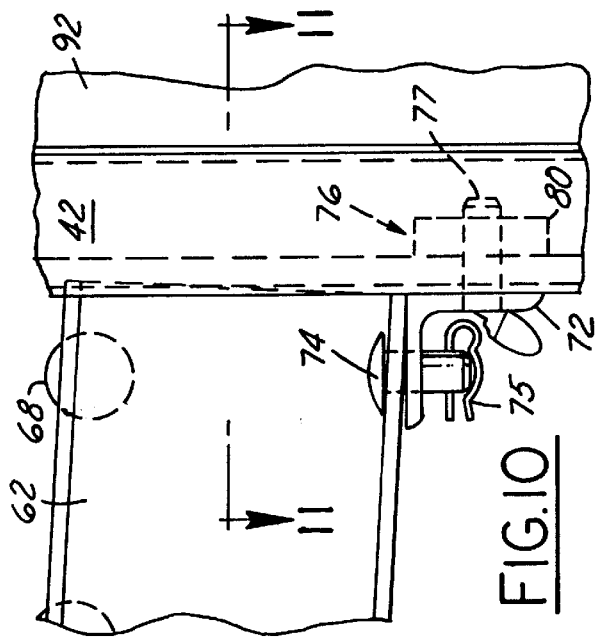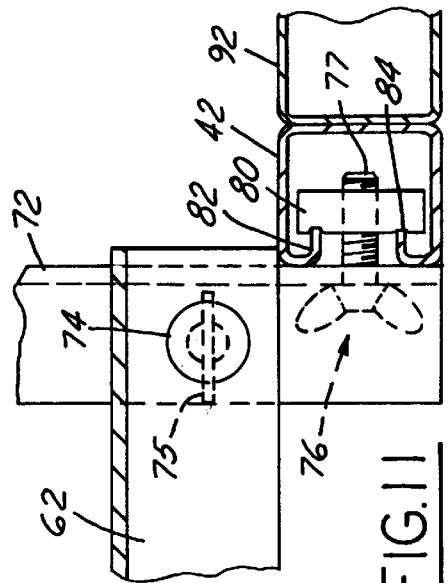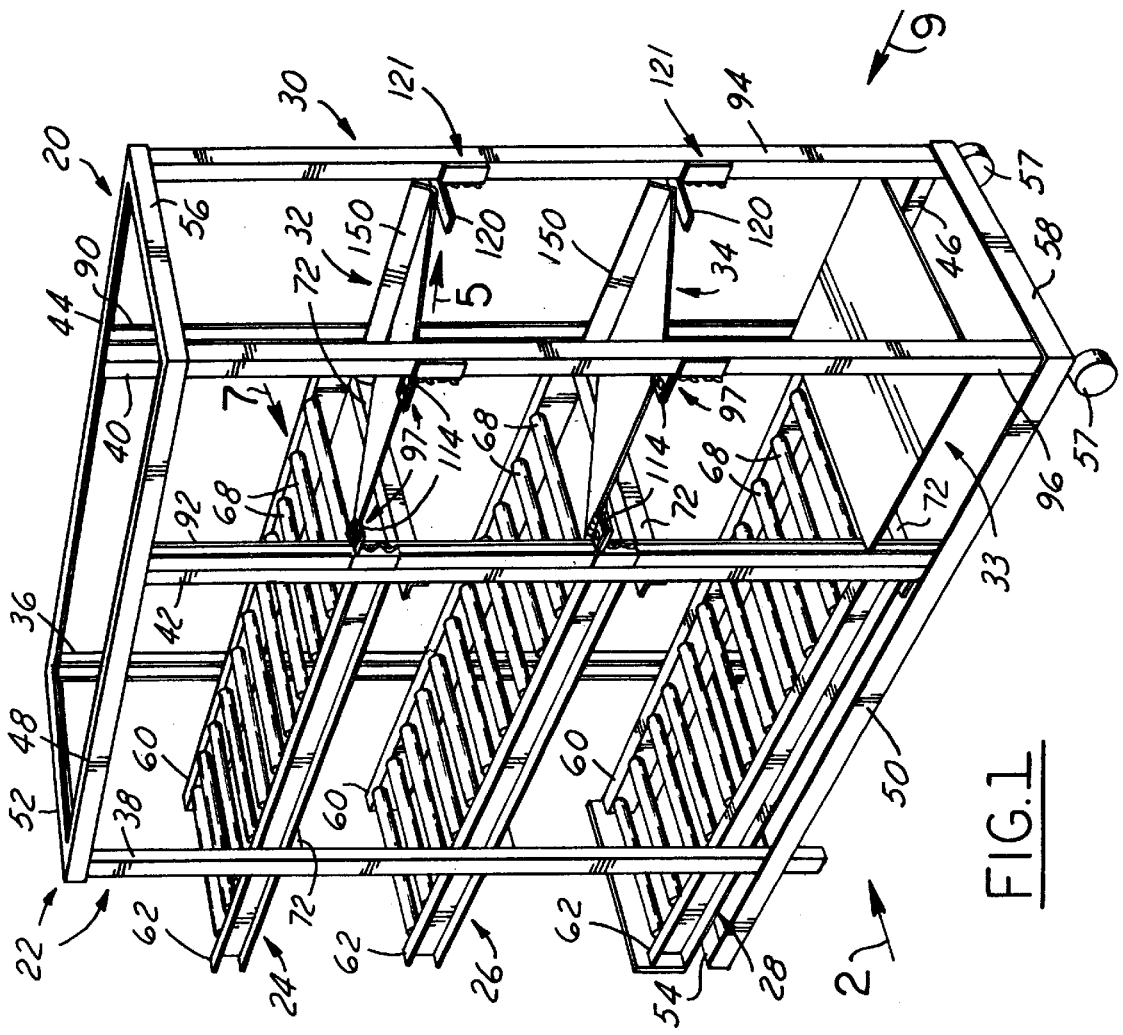

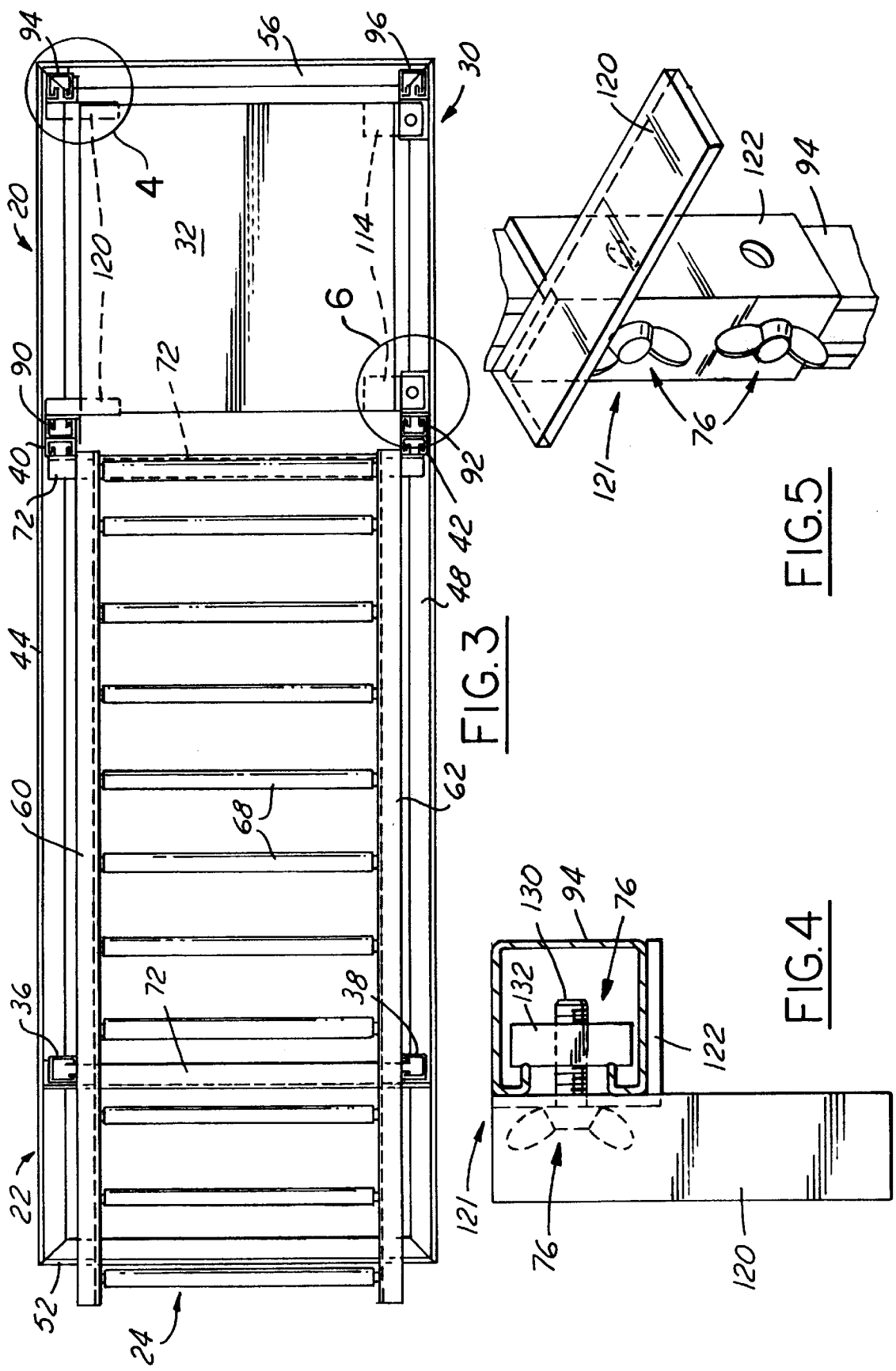

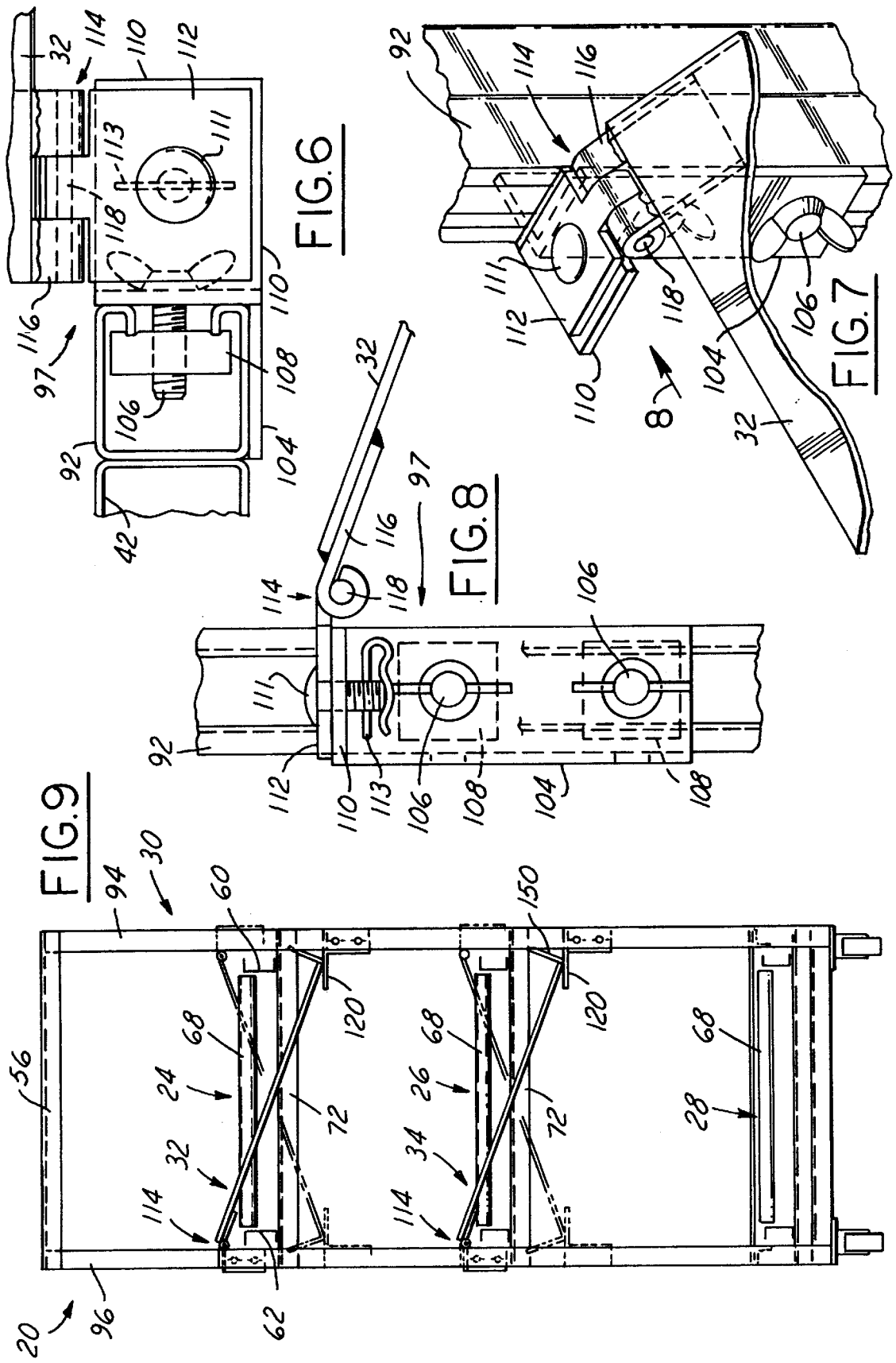

10

ADJUSTABLY MOUNTED ELONGATED CONVEYOR AND TRANSVERSE PICKING TRAY

FIELD OF INVENTION

This invention relates generally to conveyor and picking tray assemblies and more particularly to an assembly having a gravity feed conveyor and a tiltable picking tray stand.

BACKGROUND OF THE INVENTION

Many small parts are used in the assembly line production of manufactured products, such as cars and trucks. The small parts are, for example, fasteners, mechanical parts and other items used in the construction of vehicles and the like. These parts are supplied to assembly line operators at assembly work stations. An operator removes the parts from a supply container on a tray and assembles the parts on a moving flow of vehicles or vehicle sub-assemblies. It is essential that the parts container be positioned conveniently for ready access by the operator. When one container is empty, another container needs to be readily available. The tray on which the container is supported should be adjustable to accommodate the needs of each individual operator.

SUMMARY OF THE INVENTION

In accordance with the present invention, the conveyor and picking tray assembly has at least one conveyor which is tiltable so that it may convey a container or containers of parts by gravity to a picking tray, and wherein the picking tray is adjustable to tilt to a convenient angle. Preferably, the tray is tilted so that it slopes transversely of the direction of conveyor movement. The picking tray of this invention is also constructed so that the direction of slope may be reversed as is sometimes desirable depending upon the location of the assembly line being served. A straight through tray orientation is also possible.

In the specific embodiment about to be described, the conveyor preferably slopes from the rear to the front, and a picking tray at the front of the conveyor is adapted to slope from side to side or to the front, that is, in directions transversely of the conveyor or straight through along the same direction as conveyor movement. The picking tray is pivoted on a picking tray frame by slidable connectors which can be reversed to reverse the tilt of the tray or aligned to provide straight through flow along the same direction of conveyor movement. The assembly may include a second conveyor and a second picking tray, as in the embodiment about to be described. Additional trays and conveyors may be added as space permits.

One object of this invention is to provide a conveyor and picking tray assembly having the foregoing features and capabilities.

Another object is to provide a conveyor and picking tray assembly which is composed of a relatively few simple parts, is rugged and durable in use, and is capable of being easily and inexpensively manufactured, assembled and adjusted.

These and other objects, features and advantages of the invention will become more apparent as the following description proceeds, especially when considered with the accompanying drawings.

BRIEF DESCRIPTION OF THE DRAWINGS

FIG. 1 is a perspective view of a conveyor and picking tray ass empty constructed in accordance with the invention.

FIG. 3 is a top plan view of the assembly.

FIG. 4 is an enlarged fragmentary view, partly in section, of the structure shown within the circle 4 in FIG. 3.

FIG. 5 is a perspective view of the structure shown in FIG. 4.

FIG. 6 is an enlarged fragmentary view, with parts in section, of the structure shown within the circle 6 in FIG. 3.

FIG. 7 is a perspective view of the structure shown in FIG. 6.

FIG. 8 is a fragmentary elevation taken in the direction of the arrow 8 in FIG. 7.

FIG. 9 is an end view of the assembly.

FIG. 10 is an enlarged fragmentary view showing the structure within the circle 10 in FIG. 2.

FIG. 11 is a sectional view taken on the line 11—11 in FIG. 10.

DETAILED DESCRIPTION OF THE PREFERRED EMBODIMENT

Figure 2:
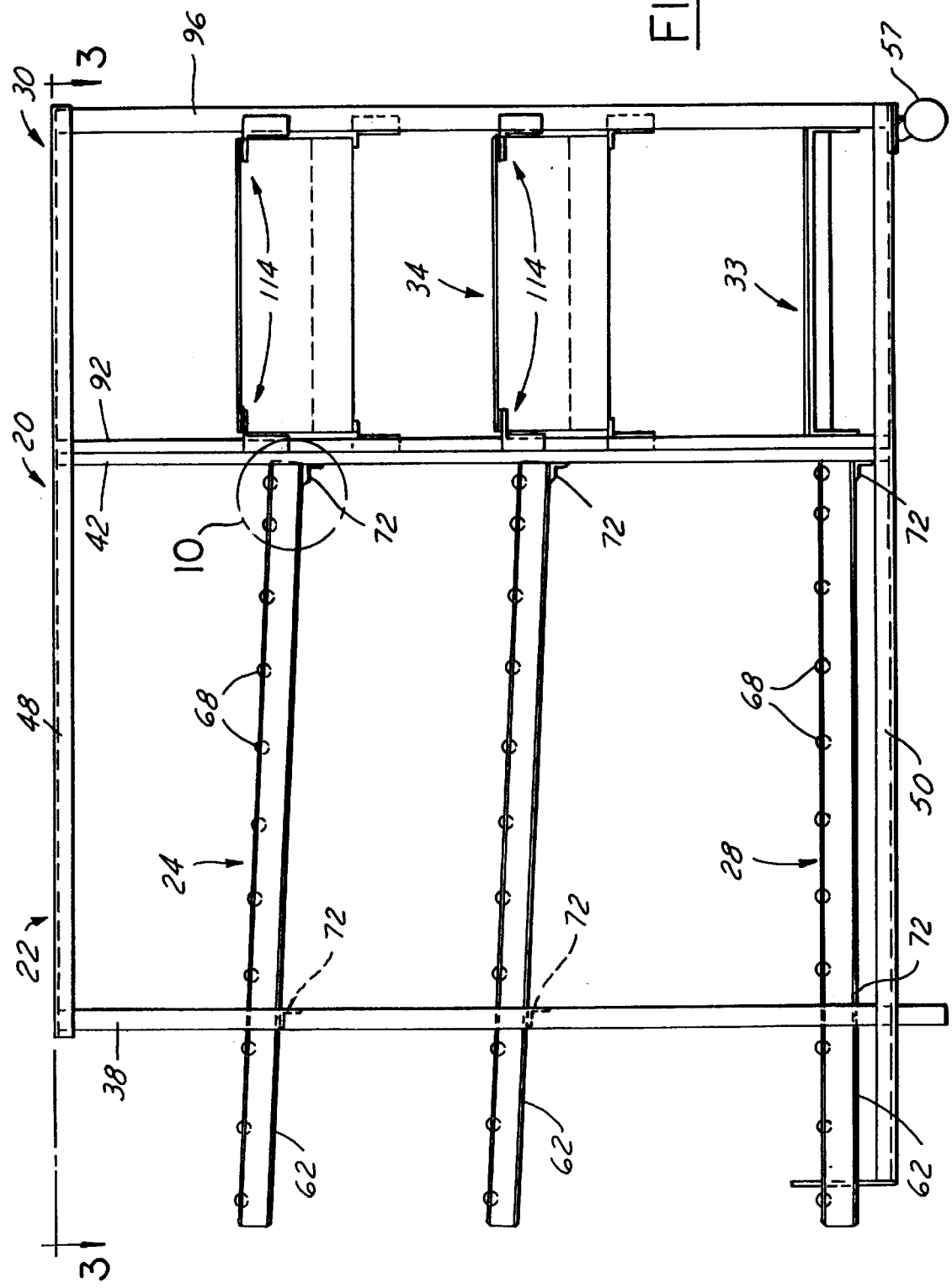
FIG. 2 is a side elevational view taken in the direction of the arrow 2 in FIG. 1.

Referring now more particularly to the drawings, the rack 20 includes a rectangular conveyor frame 22 having conveyors 24, 26 and 28. The conveyor frame 22 is interconnected with a contiguous picking tray frame 30 having trays 32 and 34. Articles such as nuts, bolts and other components to be assembled on parts moving along an assembly line are adapted to be delivered in containers (not shown) to the trays 32 and 34 by the conveyors 24 and 26. The conveyor 28 is for the return of empty containers. A fixed tray 33 may be secured to the bottom of the picking tray frame 30. The fixed tray 33 allows nesting of empty containers before returning along conveyor 28.

The conveyor frame 22 includes a pair of laterally spaced apart rear vertical supports 36 and 38 and a pair of laterally spaced apart front vertical supports 40 and 42. The rear supports are vertically elongated channels with the open sides facing laterally inwardly. The front supports are elongated channels having the open sides facing rearwardly.

Upper and lower horizontal lateral support bars 44 and 46 are rigidly secured to and interconnect the rear vertical support 36 and the front vertical support 40 on one side of the frame 22. Upper and lower horizontal lateral supports bars 48 and 50 are rigidly secured to and interconnect the rear vertical support 38 and the front vertical support 42 on the opposite side of the frame 22.

Upper and lower horizontal transverse support bars 52 and 54 are rigidly secured to and interconnect the rear ends of the lateral supports bars 44,48 and 46,50. Upper and lower horizontal transverse support bars 56 and 58 are rigidly secured to and-interconnect the front ends of the lateral support bars 44,48 and 46,50. Rollers 57 may be provided at the forward ends of the lateral supports bars 46 and 50.

The conveyor frame 22 is an open, elongated rectangular frame with the conveyors 24,26 and 28 extending one above the other lengthwise therewithin, and with the rear ends thereof disposed rearwardly of the rear vertical supports 36 and 38 and the front ends terminating adjacent the front vertical supports 40 and 42.

Each conveyor has laterally spaced parallel side bars 60 and 62 of channel cross section. A plurality of parallel rollers 68 extend transversely of each conveyor having their ends journalled in the side bars for free rotation.

The rear end portions of the side bars 60 and 62 of each of the conveyors 24–28 rest on the top horizontal leg of a cross bar 72 of right angle cross section at the rear of the conveyor frame. The front end portions of the side bars 60 and 62 of each of the conveyors 24–28 rest on the top horizontal leg of a cross bar 72 at the front of the conveyor frame. Releasable fasteners which may include a bolt or pin 74 and a cotter pin 75 (FIG. 10) secure the bottom leg of the side bars 60 and 62 of the conveyors 24–28 to the top horizontal leg of the cross bars 72.

The ends of each of the cross bars 72 at the rear of the conveyor frame are vertically adjustably secured to the rear vertical supports 36 and 38 of the conveyor frame. The ends of each of the cross bars 72 at the front of the conveyor frame are vertically adjustably secured to the front vertical supports 40 and 42. (See FIGS. 10 and 11) To accomplish this, fasteners 76 are provided which may include wing bolts 77 which extend through the vertical legs of the cross bars 72 and thread into nuts 80 within the channel-shape-d front vertical supports 42.

The channel-shaped supports have side flanges whose free edges are return-bent laterally inwardly to provide tracks 82 slidably engaged by grooves 84 in the nuts 80 to prevent the nuts from rotating. The adjustable frame bar connections provided by the channel-shaped vertical supports 36–42 and including fasteners 76 consisting of the nuts 80 and bolts 77 are well known in the art. They permit the ends of the conveyors to be vertically adjustable independently of one another to any desired position.

The conveyors 24 and 26 while generally horizontal, preferably are sloped downwardly from the rear end to the front end so that containers carrying parts will move naturally by gravity toward the trays 32 and 34 at the front end of the conveyor. The conveyor 28 may be horizontal or may slope downwardly from front to rear to return empty containers.

The picking tray frame 30 includes a pair of laterally spaced apart rear vertical supports 90 and 92 and a pair of laterally spaced apart front vertical supports 94 and 96. The rear vertical supports are vertically elongated channels, the bases of which abut and are secured to the front vertical supports 40 and 42 of the conveyor frame 22, with the open sides of the channels facing forwardly. The front vertical supports 94 and 96 are elongated channels having the open sides facing rearwardly.

The forward extensions of the upper and lower horizontal lateral support bars 44 and 46 of the conveyor frame 22 are rigidly secured to and interconnect the rear vertical support 90 and the front vertical support 94 on one side of the picking tray frame 30. The forward extensions of the upper and lower horizontal lateral support bars 48 and 50 of the conveyor frame 22 are rigidly secured to and interconnect the rear vertical support 92 and the front vertical support 96 on the opposite side of the picking tray frame 30.

The picking tray frame 30 is an open rectangular frame within which the trays 32 and 34 are mounted in vertically spaced relation at approximately the level of the front ends of the upper and middle conveyors 24 and 26.

Each tray 32, 34 is a generally flat rectangular panel. One side edge of each tray is pivoted to the vertical supports 92 and 96 of the picker tray frame 30 by connectors 97 at one side thereof for vertical swinging movement about a horizontal pivotal axis which is parallel to the lengthwise dimension of the conveyor frame and conveyors and which may be raised or lowered to the desired vertical position, to achieve a desired slope for the trays. Trays 32 and 34 may be positioned to block movement of dunnage at the front of conveyors 24 and 26.

Specifically, each connector 97 includes an angle member 104 which is vertically slidable on each of the vertical supports 92, 96 and is secured thereto by fasteners similar to the fasteners 76 previously described (See FIGS. 6–8). Each such fastener includes a bolt 106 extending through a hole in a flange of the angle member 104 and threads into a nut 108 within the channel-shaped vertical supports 92 and 96. When the fasteners are tightened, the angle members are clamped to the respective vertical supports 92,96 in vertically adjusted position.

The angle members 104 each have an integral pad 110 which is secured by a bolt or pin 111 to a leaf 112 of a hinge 114. Pin 111 is held by a cotter 113. The leaf 112 is pivoted to a forked projection 116 on the tray by a hinge pin 118. The hinge pins 118 are at one side of the tray and are aligned to establish the pivot axis previously referred to which, as stated, is parallel to the lengthwise dimension of the conveyor frame.

The opposite side of each tray, that is, the unhinged side thereof, is supported on a pair of rests 120 which are mounted on the vertical supports 90 and 94 by connectors 121 including angle members 122 which are vertically slidably mounted on the respective vertical supports 90 and 94. (See FIGS. 4 and 5) The angle members 122 are secured thereto by fasteners similar to the nut and bolt assemblies 76 previously described. Thus, each such fastener includes a bolt 130 extending through a flange of the angle member 122 which threads into a nut 132 with one of the channel-shaped vertical supports 90,94. When the fasteners are tightened, the angle members, and hence the rests 120 on which the unhinged side edges of the trays are supported, is clamped in a vertically adjusted position.

As seen in FIGS. 1 and 9, the trays slope from one side to the other, with the slope preferably extending downward from the hinged side to the unhinged side thereof. This direction of slope is transverse to the lengthwise dimension of the conveyors. Straight through flow is also possible. A container supported on a sloping tray is conveniently positioned to permit an operator to reach in to the container and remove an article to be assembled on a part moving along an adjacent assembly line. The angle of slope of the tray, and hence of the container supported thereon, may be increased or decreased, and the level of the tray may be raised or lowered to suit the convenience of an individual operator. The lower or unhinged edge of the trays 24 and 26 preferably has an upwardly extending lip 150 to prevent the container from slipping off.

One of the advantages of the construction described is that it is possible to reverse one or both of the trays so that the hinged edge is at the opposite side of the frame from that shown in solid lines in FIG. 9. This reversal of the trays is shown in broken lines. All that is required is the removal of the angle members 104 from the upright supports 92 and 96, the removal of the angle members 122 from the supports 90 and 94, then rotating the tray with the attached angle members 180° and reconnecting the angle members 122 to the vertical supports 92 and 96 and the angle members 104 to the vertical supports 90 and 94. Whether the trays are sloped in one direction or the other depends upon the location of the assembly line and the wishes of the operator. In either case, the tray slope is transverse to the lengthwise dimension of the conveyors 24–28 and the conveyor frame 22.

It is possible to connect the trays 32 and 34 so that they slope forwardly and downwardly from their associated conveyors. Connectors 97 may be attached to vertical supports 90 and 92 by removal, 90 degree rotation and fastening from the positions shown in FIG. 1. Connectors 121 are likewise removed, rotated 90° and refastened on supports 94 and 96 to support the lip 150 of each tray between supports 94 and 96.

What is claimed is:

1. A conveyor and picking tray assembly comprising, an elongated conveyor frame having a rear end and a front end, at least one elongated conveyor having a rear end, a front end and first and second sides and a longitudinal axis, first means vertically adjustably mounting the rear end of said conveyor on the rear end of said conveyor frame, second means vertically adjustably mounting the front end of said conveyor on the front end of said conveyor frame at a level beneath the rear end of said conveyor so that said conveyor slopes downwardly from the rear end of the conveyor to the front end of the conveyor, a picking tray frame, third means connecting said picking tray frame to the front end of said conveyor frame, said picking tray frame having a first side adjacent the first side of said conveyor and a second side adjacent the second side of said conveyor, a picking tray having a rear end adjacent to the front end of said conveyor, a front end and first and second sides, fourth means vertically adjustably mounting the first side of said picking tray on the first side of said picking tray frame, and fifth means vertically adjustably mounting the second side of said picking tray on the second side of said picking tray frame at a level beneath the first side of said picking tray so that said picking tray slopes downwardly from the first side said picking tray to the second side of said picking tray in a direction transversely of the longitudinal axis of said conveyor.

2. A conveyor and picking tray assembly as defined in claim 1, wherein said fourth means is releasably connected to the first side of the picking tray frame and the first side of said picking tray is connected to said fourth means for pivotal movement of said picking tray about a horizontal axis.

3. A conveyor and picking tray assembly as defined in claim 2, wherein said fifth means is releasably connected to the second side of the picking tray frame and comprises a support providing a rest for the second side of said picking tray.

4. A conveyor and picking tray assembly comprising, an elongated conveyor frame having a rear end and a front end, at least one elongated conveyor having a rear end, a front end and first and second sides and a longitudinal axis, first means vertically adjustably mounting the rear end of said conveyor on the rear end of said conveyor frame, second means vertically adjustably mounting the front end of said conveyor on the front end of said conveyor frame at a level beneath the rear end of said conveyor so that said conveyor slopes downwardly from the rear end of the conveyor to the front end of the conveyor, a picking tray frame, third means connecting said picking tray frame to the front end of said conveyor frame, said picking tray frame having a first side adjacent the first side of said conveyor and a second side adjacent the second side of said conveyor, a picking tray having a rear end adjacent to the front end of said conveyor, a front end and first and second sides, fourth means vertically adjustably mounting the first side of said picking tray on the second side of said picking tray frame, and fifth means vertically adjustably mounting the second side of said picking tray on the first side of said picking tray frame at a level beneath the first side of said picking tray so that said picking tray slopes downwardly from the first side of said picking tray to the second side of said picking tray in a direction transversely of the longitudinal axis of said conveyor.

* * * * *